April 30, 1929.　　　L. D. SOUBIER　　　1,710,790
GLASS WORKING TANK
Filed April 30, 1927　　　2 Sheets-Sheet
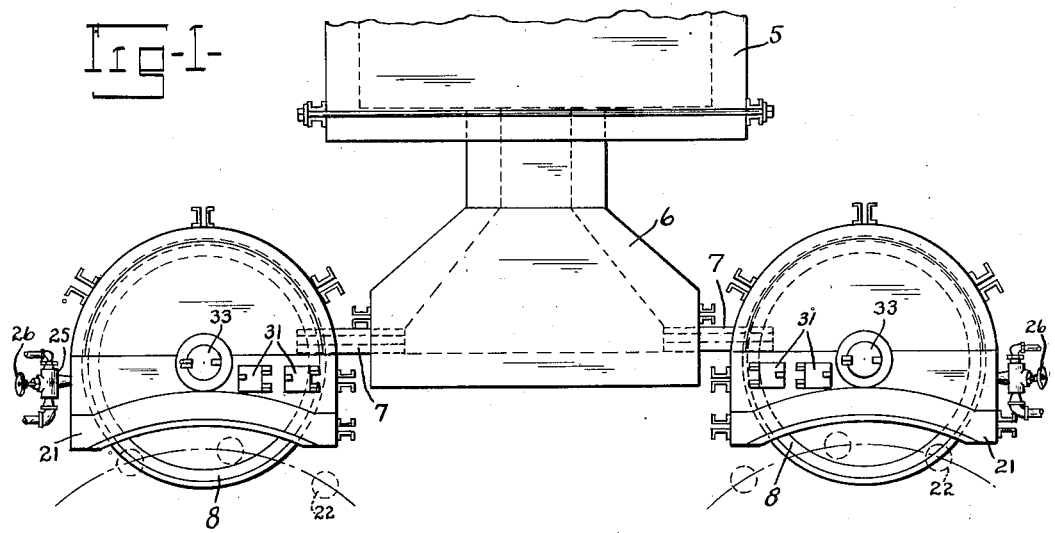
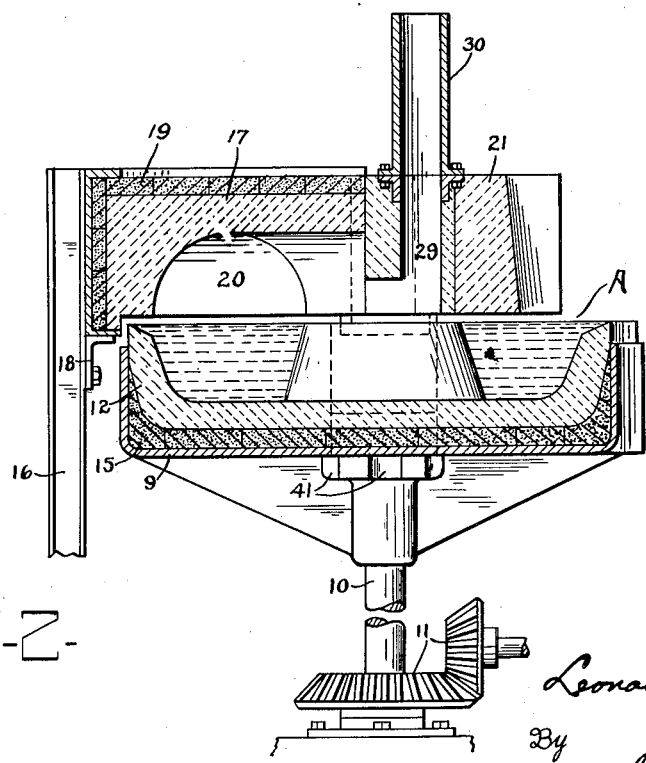
Inventor
Leonard D. Soubier,
By J. F. Rule.
Attorney

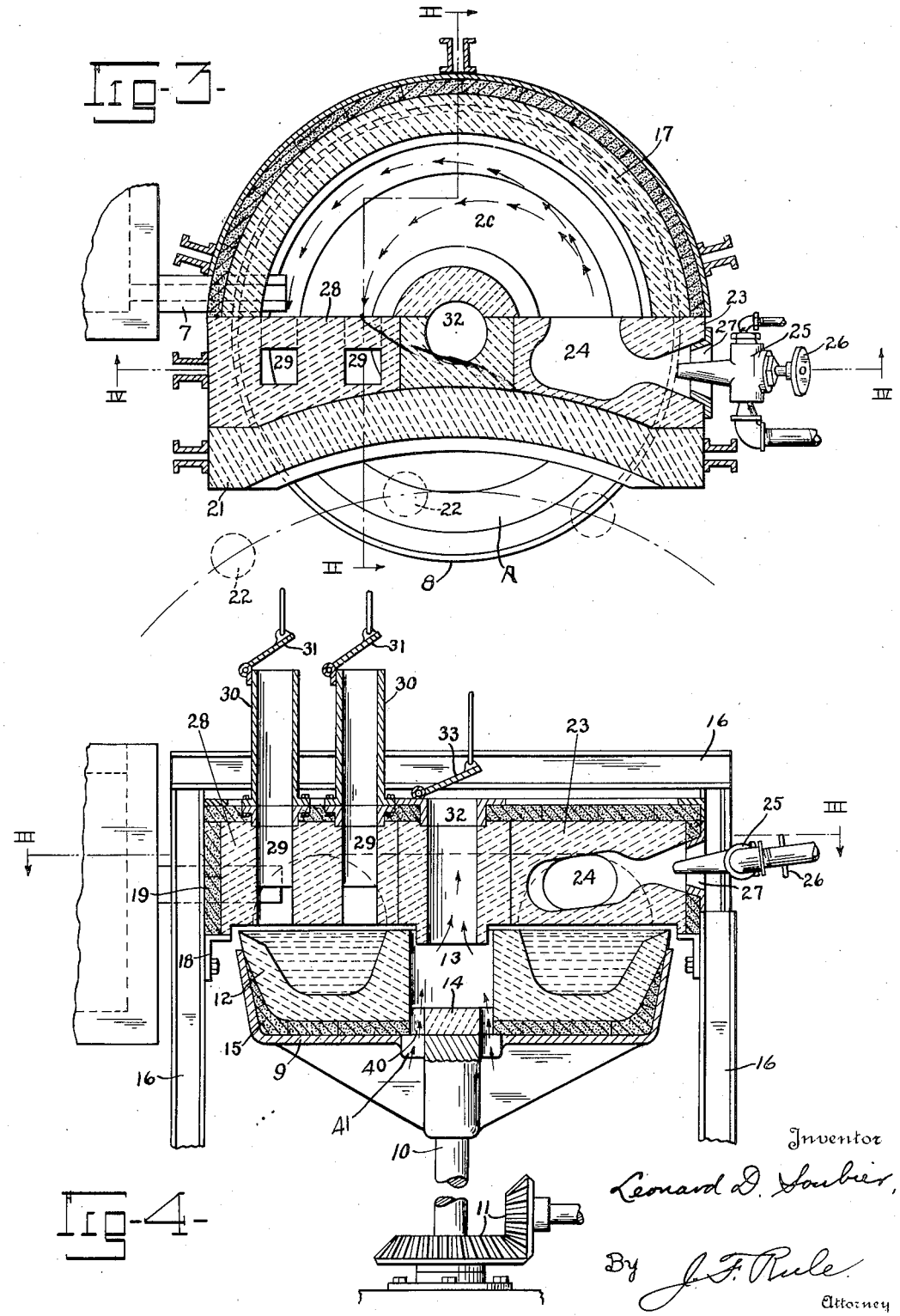

Patented Apr. 30, 1929.

1,710,790

UNITED STATES PATENT OFFICE.

LEONARD D. SOUBIER, OF TOLEDO, OHIO, ASSIGNOR TO THE OWENS BOTTLE COMPANY, OF TOLEDO, OHIO, A CORPORATION OF OHIO.

GLASS-WORKING TANK.

Application filed April 30, 1927. Serial No. 187,830.

The present invention relates to improvements in glass working tanks and particularly to that type embodying a pot rotating about a fixed vertical axis and presenting molten glass at an exposed gathering point from which charges of glass are gathered into forming holds by suction.

According to the present practice revolving pots or tanks from which the well known Owens type forming machines gather charges of molten glass, are partly enclosed by a refractory cover which protects the glass in the pot from chilling by contact with outside air and is intended to cause concentration of heat upon the glass surface. The heat playing over the glass surface and more or less confined beneath the pot cover is not controllable as to its path of circulation and cannot be specifically applied to any selected area as is often desired to dissipate "blisters", etc. Also, there is a strong tendency for the heat to concentrate upon the glass in and adjacent the center so that such glass is in a highly fluent and perhaps ideal working condition. The fact that there is a natural tendency for the heat to concentrate in the center, necessitates utilization of an exceptionally large amount of fuel in order that the glass spaced outwardly from the center in the gathering area may be brought to the desired temperature and properly conditioned for use in ware formation.

In apparatus including the suction type machine and a revolving pot, a chilled tail portion of glass is deposited on the surface of glass in the tank after each charge gathering operation such portion generally remaining upon the glass surface for a considerable length of time and frequently trapping air as it drops to the surface. Thus, the surface of the glass is frequently dotted with blisters and small lumps of chilled glass, which, if gathered into blank molds, cause the formation of more or less defective ware. The impossibility of specific application of intense heat to the particular area or areas in which these blisters and chilled portions are found, necessitates periodic changing in the time relation of movements of the forming machine and revolving pot so that the molds do not always gather from the same point.

An object of the present invention is to provide means effecting an economy in fuel consumption and so construct a revolving tank and cover therefor, that concentration of heat upon any selected area may be readily obtained. To this end, the invention comprises the formation of a revolving pot including an annular channel to which molten glass is supplied and from which charges are gathered at a predetermined gathering point into the forming molds. This trough construction is such that the center is in the form of a dead air chamber and all of the molten glass is located in or in proximity to the gathering area. This trough is provided with a cover having a heat conduit in the form of an arcuate channel opening downwardly and arranged in its entirety directly over a major portion of the annular trough to thereby insure application of all heat to the glass surface. The remaining portion of the cover extends downwardly in proximity to the center of the tank so that useless heating of areas other than those directly over the glass is eliminated, effecting economy in fuel consumption.

There is further provided means to project a flame into one end of the heat conduit to heat the latter, this heat being drawn through the conduit in contact with the surface of the glass in the annular trough and then exhausted to the atmosphere through stacks located at the opposite end of said conduit. These stacks may be operated independently of each other so that the heat drawn through the conduit may be concentrated upon the glass adjacent the outer wall of the trough or caused to follow a path adjacent the inner wall of the trough. Thus, it is seen that the heat may be concentrated upon any selected portion of the glass, depending upon temperature conditions and location of blisters and chilled portions to be dissipated.

Other objects will be apparent hereinafter.

In the accompanying drawings:

Fig. 1 is a plan view showing a pair of glass working tanks constructed in accordance with the present invention and operating in conjunction with a single extension on a furnace.

Fig. 2 is a sectional view taken substantially along the line II—II of Fig. 3.

Fig. 3 is a sectional view taken substantially along the line III—III of Fig. 4, and Fig. 4 is a sectional view taken along the line IV—IV of Fig. 3.

Referring to the drawings, a furnace 5 is formed with a lateral extension 6 from opposite sides of which are directed spouts or troughs 7, through which molten glass is discharged into revolving tanks or pots 8.

Each revolving tank or pot 8 comprises a metal casing or shell 9 fixed to the upper end of a vertical shaft 10 which is continuously rotated by any suitable means (not shown), transmitting rotary movement to said shaft through a pair of meshing bevel gears 11. Arranged in the casing or shell 9, is an annular channel or trough 12 formed of suitable refractory material. This trough is of such formation that a chamber 13 is provided at the center, the refractory block 14 forming lower end of said chamber and the casing 9 being provided with aligned openings 40 and 41 communicating with the atmosphere. Suitable insulating material 15 is interposed between the annular trough 12 and the metal casing 9 for obvious reasons.

A cover encloses the upper side of the revolving tank or trough and is supported on a framework 16 (Fig. 4). This cover includes a refractory block or blocks 17 resting upon angle iron units 18 fixed to said framework 16, said refractory block being covered on its outer faces with a suitable insulating material 19. An arcuate heat conduit 20 is formed on the under side of the cover block 17, said conduit being located in its entirety directly above the annular trough 12 and having its ends closed by refractory blocks which abut a jack-arch 21 of the usual form providing an exposed gathering area "A" at which the molds 22 dip into the glass to gather charges by suction. The conduit wall is curved transversely and provides a comparatively large reflecting surface materially contributing to conservation of fuel and increasing the effectiveness of the heating system.

A refractory block 23 closing one end of the arcuate heat conduit 20 is formed with a combustion chamber 24 opening directly into said end of the conduit, and is provided with a fuel injector 25 including a manually operable fuel flow control valve 26. This injector 25 extends slightly into the combustion chamber through an opening, a portion of whose walls are protected by a metal bushing 27. The block 28 at the other end of the conduit 20 is formed with a pair of radially spaced stacks 29 directed upwardly from a point in proximity to the surface of the glass. This block 28 has its lower side arranged in proximity to the molten glass surface, whereby the flame and products of combustion exhausted through the stacks formed in said block are forced into intimate contact with such glass. The stacks 29 rise above the block 28 and are provided at their upper ends with draft control dampers 31 which may be operated independently of each other in any approved manner.

An outlet 32 is formed in the cover block 17 directly over and communicating with the chamber 13 in the center of the revolving pot. Cool outside air enters the lower end of the chamber through a series of openings 40 in the block 14 and casing 9. This outlet is closable by means of a damper 33 and functions to permit escape of heat from this particular area whereby equalization of temperature in the inner and outer walls of the trough 12 is readily attained.

In operation, the molten glass is supplied diretly to the annular trough 12 through a spout or trough 7. Continuous rotation of the trough or tank 12 brings freshly heated glass to the gathering area in front of the jack-arch 21, permitting dipping of molds into the glass for gathering of charges by suction. As brought out heretofore, after each charge gathering operation, there is a certain amount of chilled glass which strings out from the charge or charges in the mold and is cut off so that it falls back into the main body of glass, settling upon the surface of the main body of glass and frequently trapping air upon the surface of the main body, forming bubbles or blisters which quite often are gathered into the mold or molds upon the next presentation of this particular portion of glass to the gathering area causing blowing of defective ware. With the present tank construction, these chilled portions of glass are moved rearwardly beneath the tank cover and are subjected to the intense heat supplied from the combustion chamber 24, such heat being directly applied to the glass surface for a distance considerably in excess of one-half of the trough rotation. Preferably, the heat is circulated in the direction of movement of the glass to prevent disturbance of the glass surface. The intensity of the heat applied is readily controlled by manipulation of the valve 26 in the injector 25. By individual operation of the dampers 31 upon the stacks 30, the path of travel of the heat may be effectively regulated and the heat concentrated upon the blistered surface or any other area requiring more than average heating. For example, by opening the damper in the stack adjacent the center of the pot and closing the other damper, the heat will be concentrated upon glass adjacent the inner wall of the trough 12. On the other hand, if the open positions of the dampers are reversed, the heat will be more specifically applied to that portion of the glass in proximity to the rim or outer wall of the tank. Also, both dampers may be opened and thereby cause a uniform distribution of heat over the entire surface of glass in the trough 12. Thus, it is seen that heating of the glass in the trough may be readily and quite accurately controlled and may be readily concentrated upon any desired area.

Manifestly, certain minor changes may be resorted to within the spirit and scope of the appended claims.

What I claim is:

1. A glass working tank comprising an annular trough to contain molten glass from which charges are gathered, means to rotate the trough about a vertical axis, a cover arranged to enclose a portion of the trough and to expose a gathering area, means to direct heat over and in contact with the glass in said trough beneath the cover, and means to control the path of heat movement over the glass.

2. A glass working tank comprising an annular trough to contain molten glass from which charges are gathered, means to rotate the trough about a vertical axis, a cover to enclose a portion of the trough and expose a gathering area, means to direct heat over and in contact with the glass in said trough in the direction of travel of the glass, and means including radially spaced stacks to exhaust heat from beneath the cover.

3. A glass working tank to contain molten glass, comprising an annular trough rotatable about a vertical axis extending therethrough, a cover for the trough having an arcuate conduit arranged directly over a portion of said trough, a combustion chamber at one end of said conduit to inject a flame into the latter, and means at the opposite end of the conduit to exhaust heat from the latter.

4. A glass working tank to contain molten glass, comprising an annular trough rotatable about a vertical axis extending therethrough, a cover for the trough having an arcuate conduit arranged directly over a portion of said trough, a combustion chamber at one end of said conduit to inject a flame into the latter, radially spaced stacks at the opposite end of said conduit, and means to control the relative effectiveness of the stacks to thereby control the path of movement of heat over the glass in said trough.

5. A glass working tank comprising an annular trough to contain a supply body of molten glass, said trough having a vertical central chamber defined by the inner wall of the trough and opening through both ends to the atmosphere, and means to rotate the trough about a vertical axis extending centrally through said chamber.

6. A glass working tank comprising an annular trough to contain a supply body of molten glass, said trough having an open central chamber defined by the inner wall of the trough, means to rotate the trough about a vertical axis extending centrally through said chamber, a cover for the trough, means to apply heat to the surface of the glass beneath the cover, and means causing exhaust of heat from said chamber directly to the atmosphere above the cover.

7. A glass working tank comprising an annular trough to contain a supply body of molten glass, said trough having an open central chamber defined by the inner wall of said trough, means to rotate the trough about a vertical axis extending through said open central chamber, a cover for the trough, means to apply heat to the surface of the glass beneath the cover, means causing exhaust of heat from the open central chamber, and stacks extending upwardly through said cover to exhaust heat from areas over and in proximity to the glass surface.

8. A glass working tank comprising an annular trough to contain a supply body of molten glass, said trough having an open central chamber, means to rotate the trough about a vertical axis extending through said open central chamber, a cover for the trough, means to apply heat to the surface of the glass beneath the cover, means causing exhaust of heat from the open central chamber, stacks extending upwardly through said cover to exhaust heat from areas over and in proximity to the glass surface, and individually operable dampers for the stacks adjustable to vary the relative effectiveness of the latter and thereby control the path of movement of heat over the glass surface.

9. A glass working tank to contain molten glass from which charges are gathered comprising an annular horizontally rotatable trough, a cover enclosing a major portion of the upper side of the trough and formed to provide an exposed gathering area, said cover having an arcuate heat conduit in its lower side over the trough and terminating adjacent said gathering area, means to direct heat through one end of the conduit, and heat exhausting means at the other end of the conduit, said exhaust means being operable to control the path of movement of the heat in said conduit.

10. A glass working tank to contain molten glass from which charges are gathered comprising an annular trough, a cover to enclose a portion of the upper side of the trough and terminating at a point to form an exposed gathering area, means to apply heat to the glass surface beneath said cover, and means to cause circulation of the heat in the direction of travel of and over the covered glass and exhaust the heat at a point adjacent said gathering area.

11. The combination with a tank, means for supplying molten glass thereto, and means for rotating the tank, of means for supplying heat and causing it to circulate in contact with the surface of all or a portion of the glass in the tank, in an arcuate path substantially concentric with the axis of rotation of the tank.

12. The combination with a tank, means for supplying molten glass thereto, and means for rotating the tank, of a stationary cover for the tank provided with a horizontally disposed channel directly over and open to the glass in the tank, and adjustable means for directing a heating medium through said channel in contact with the surface of all or a portion of the glass in a predetermined area of the tank.

13. The combination with a tank, means for supplying molten glass thereto, and means for rotating the tank, of a burner, a horizontally disposed channel communicating with the burner and arranged concentrically of the tank over the glass therein, and adjustable means to predetermine the path of heat movement through the channel.

14. The combination with a tank, means for supplying molten glass thereto, and means for rotating the tank, of means extending circumferentially of the tank over the glass therein for directing heated gases along the surface of the glass in different paths, and means for differentially controlling the movement of the gases in said paths.

Signed at Toledo, in the county of Lucas and State of Ohio, this 28th day of April, 1927.

LEONARD D. SOUBIER.